United States Patent
Ressel et al.

(10) Patent No.: US 6,570,603 B2
(45) Date of Patent: May 27, 2003

(54) MULTI-BEAM EXPOSURE METHOD

(75) Inventors: Peter Ressel, Schönkirchen (DE); Andreas Scheffler, Kiel (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

(21) Appl. No.: 09/933,506

(22) Filed: Aug. 20, 2001

(65) Prior Publication Data

US 2002/0030733 A1 Mar. 14, 2002

(30) Foreign Application Priority Data

Sep. 13, 2000 (DE) .......................... 100 45 168

(51) Int. Cl.$^7$ ................................ B41J 2/435
(52) U.S. Cl. ........................ 347/237; 347/247
(58) Field of Search ................. 347/233, 237, 347/240, 247, 251, 132

(56) References Cited

U.S. PATENT DOCUMENTS 5,724,086 A * 3/1998 Mackin et al. .............. 347/237

* cited by examiner

Primary Examiner—Hai Pham
(74) Attorney, Agent, or Firm—Schiff Hardin & Waite

(57) ABSTRACT

In a method for multi-beam exposure of a printing form, preferably with laser beams, a computer transmits printing form data to a distributor via a data line as a sequence of recording lines and the distributor cyclically distributes the recording lines onto the input stages of an optics head where N parallel laser beams are generated and modulated with the printing form data of the recording lines. The laser beams are subdivided into active and inactive laser beams, recording lines of the printing form are transmitted via the data line for the active laser beams, and empty lines are inserted into the transmitted sequence of the recording lines for the inactive laser beams. The empty lines contain data values with which the inactive laser beams are driven dark.

4 Claims, 3 Drawing Sheets

MULTI-BEAM EXPOSURE METHOD

BACKGROUND OF THE INVENTION

The invention is in the field of electronic reproduction technology and is directed to a method for the exposure of recording materials with a plurality of, for example, parallel light beams, preferably laser beams, whose brightness is controlled dependent on the information to be recorded.

In electronic reproduction technology, multi-beam exposure methods are utilized for the exposure of printing forms in order to achieve an adequately high exposure speed as well as an adequately high exposure intensity. For that purpose, a bundle of N parallel laser beams is moved relative to the recording material and N lines of the image data to be recorded are simultaneously exposed with every sweep. The printing forms can be exposed on film material, so what are referred to as color separation films arise, these subsequently serving for the production of printing plates with a photographic re-copying method. Instead, the printing plates themselves can be exposed in a multi-beam plate exposer or in a digital printing press. Finally, there is also the application of multi-beam exposure methods in order to produce flexo-printing forms or rotogravure forms by selective erosion of material with high-power laser beams. The recording material can be on a drum (drum exposer), in a cylindrical trough (inside drum exposer) or on a planar plate (flatbed exposer).

A number of optical arrangements and principles are known for generating parallel laser beams. For example, one laser beam is split into a plurality of individually modulated beams by means of an acousto-optical modulator. A plurality of laser beams can also be employed, each thereof being modulated with a separate acousto-optical modulator. Or a plurality of laser diodes arranged in a row are employed, these being individually modulated. A row of laser diodes can also be integrated in a laser diode chip. Alternatively, a broad light band in front of which a row of individually controllable light valves is arranged can be generated with one laser diode.

Independently of the application, i.e. what type of printing form is produced on what recording material, and independently of the mechanical and optical arrangement employed, there is the problem in all multi-beam exposure methods that, given outage of one of the parallel laser beams until the repair thereof, the exposure unit can either not be employed at all or a limited operation with the remaining, functional laser beams is only possible with an involved and complicated control unit.

SUMMARY OF THE INVENTION

It is therefore an object of the present invention to specify a method for the multi-beam exposure of recording materials with which the exposure arrangement can continue to be operated in a simple way and, thus, cost-beneficially, even given outage of one or more laser beams.

According to the present invention, a method is provided for multi-beam exposure of the printing form, such as with laser beams. The laser beams are subdivided into active and inactive laser beams. With a computer, printing form data are transmitted to a distributor via a data line as a sequence of recording lines. Recording lines of the printing form are transmitted via the data line for the active laser beams and empty lines are inserted into the transmitted sequence of the recording lines for the inactive laser beams. The distributor cyclically distributes the recording lines onto the input stages of an optics head wherein N parallel laser beams are generated and modulated with the printing form data of the recording lines.

The Prior Art and the inventive method are explained in greater detail below on the basis of FIGS. 1 through 4.

DESCRIPTION OF THE PREFERRED EMBODIMENTS

Figure 1:
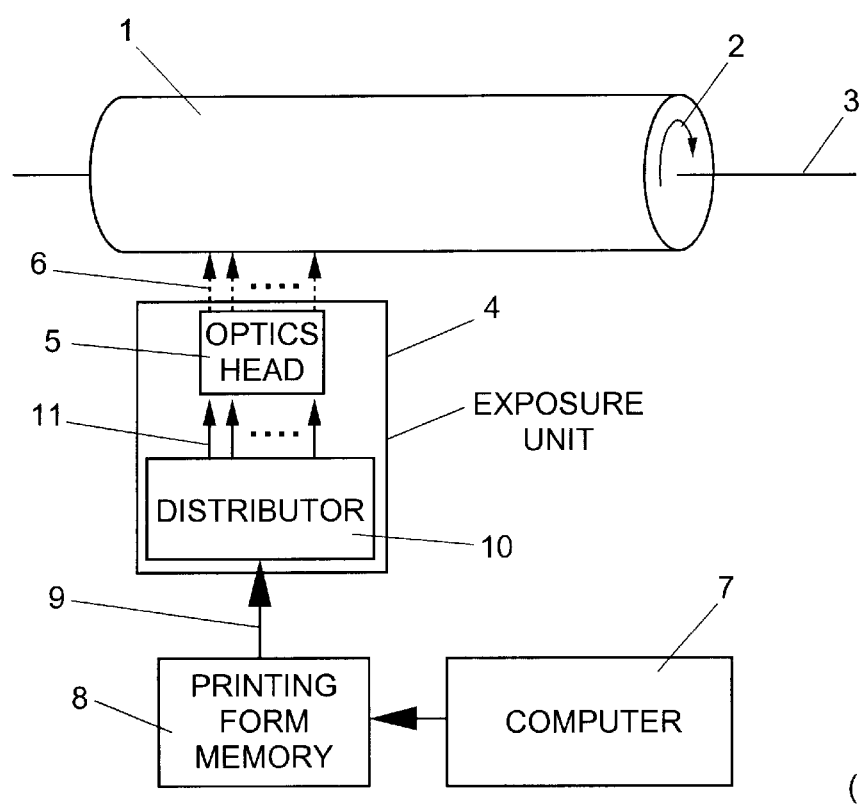
FIG. 1 is an exemplary embodiment of a multi-beam exposure unit in a drum exposer (Prior Art)

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows an exemplary embodiment of a multi-beam exposure unit according to the Prior Art designed as a drum exposer with a recording drum 1 that is seated rotatable in the circumferential direction 2 around a longitudinal axis 3. The exposure unit 4 moves along the recording drum 1 in the direction of the longitudinal axis 3, the unit 4 containing an optics head 5 in which N parallel laser beams 6 are generated and modulated. Due to the rotational motion of the recording drum 1 and the feed motion of the exposure device 4, the brightness-modulated laser beams produce a planar point-by-point and line-by-line exposure of a recording material secured on the recording drum. The feed rate is set such that the exposure unit 4, following a revolution of the recording drum 1, has moved forward by the total width of the N laser tracks recorded in parallel.

The printing form data of the printing form to be recorded are generated from scanned images, graphics elements and input texts in a computer 7 in a known way. The printing form data edited in this way are offered in the printing form memory 8. In the exposure, the printing form data are read from the printing form memory 8 line-by-line and are transmitted via a data line 9 to a distributor 10 that is contained in the exposure unit 4 in the exemplary embodiment. The distributor 10 cyclically distributes the recording lines arriving via the data line 9 onto the N write channels 11 with which the lines are handed over in parallel to the optics head 5.

Figure 2:
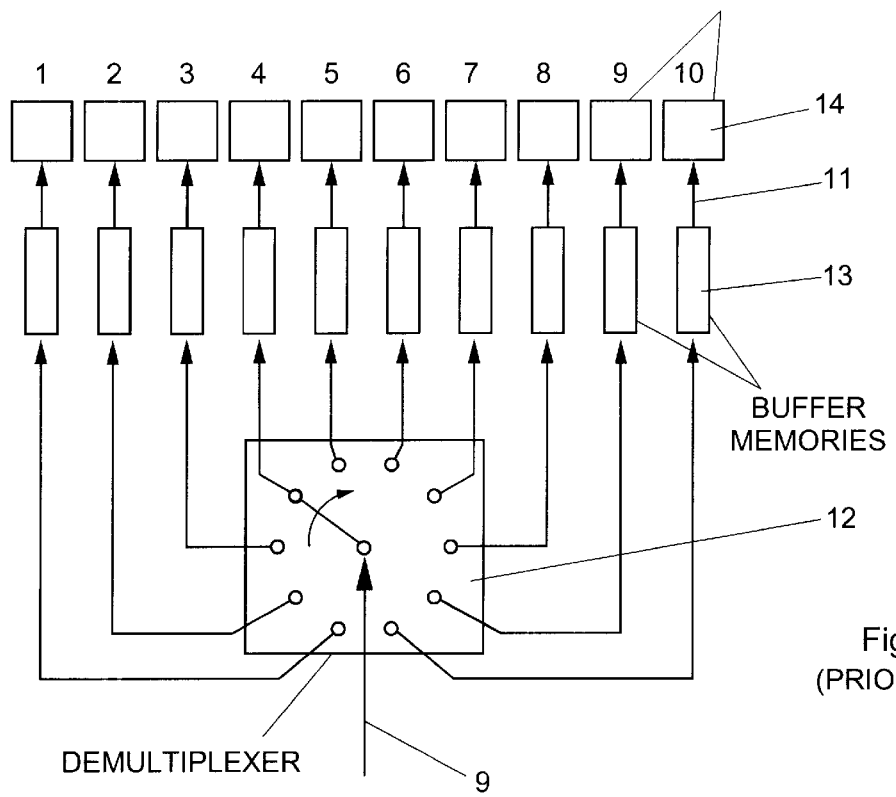
FIG. 2 illustrates the functioning of the distributor during normal operation (Prior Art)

FIG. 2 shows the function of the distributor 10 by way of example for an exposure unit 4 that records with N=10 laser beams. The recording lines arriving from the printing form memory 8 via the data line 9 are cyclically written into the buffer memories 13 by a demultiplexer 12, which is schematically shown as a rotary switch. The time executions in the printing form memory 8 on the one hand and in the exposure unit 4 on the other hand are decoupled with the buffer memories 13. Ten respective recording lines from the buffer memories 13 are then handed over in parallel to the inputs stages 14 of the optics head 5 via the write channels 11.

Figure 3:
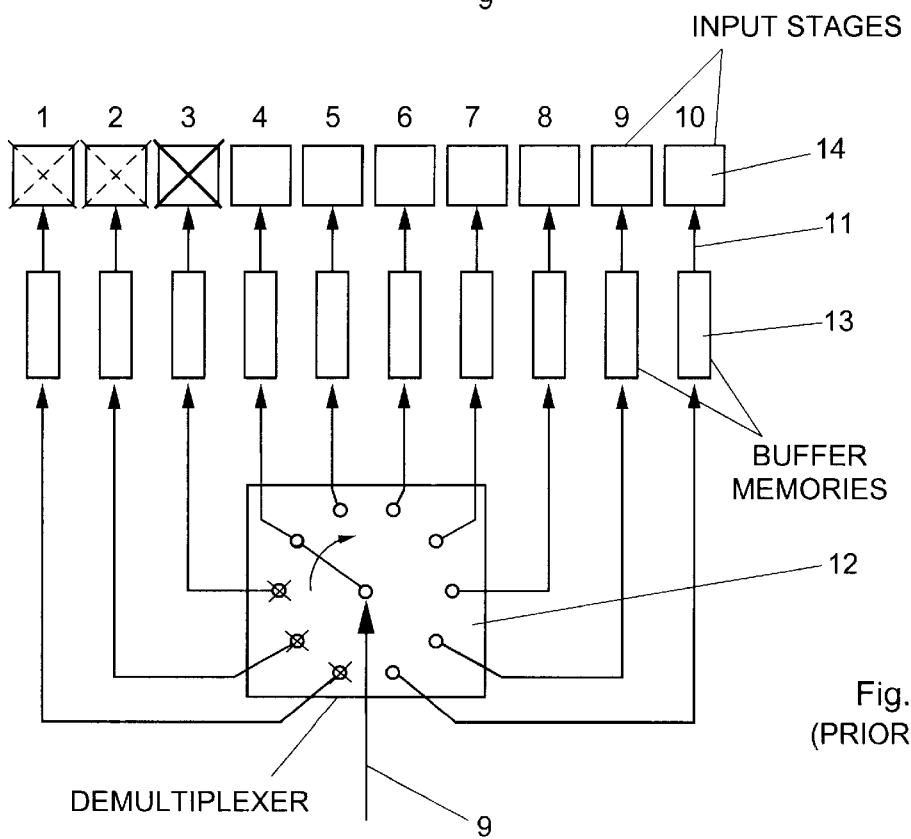
FIG. 3 shows the functioning of the distributor given outage of a laser beam (Prior Art)

When, due to a fault in the optics head 5, one or more laser beams 6 cannot be used, a limited operation of the exposer with an interconnected group of remaining laser beams is still possible until the fault is repaired. FIG. 3 shows such an instance with reference to an example. It is assumed in the example that laser beam No. 3 has failed, this being identified in FIG. 3 by a bold-face cross in the corresponding input stage 14. The largest interconnected group of remaining laser beams 6 are then the laser beams No. 4 through No. 10. Exposure can continue to be carried out with this group if the demultiplexer 12 is reconfigured such that it now cyclically writes the incoming recording lines only into the buffer memories 13 belonging to the laser beams No. 4 through No. 10. The first three distribution positions of the demultiplexer 12 must thereby be skipped, this being indicated in FIG. 3 by crosses in the respective positions, i.e. the demultiplexer 12 must work as though it only had seven distribution positions. Moreover, the laser beams No. 1 and No. 2 must be deactivated, this being identified in FIG. 3 by a broken-line cross in the corresponding input stages 14. Additionally, the feed rate must be set such that, following a revolution of the recording drum 1, the exposure unit 4 has only moved ahead by the total width of the remaining seven laser tracks recorded in parallel.

An involved control of the distributor 10 is required in order to be able to reconfigure the demultiplexer 12 of the Prior Art for all conceivable variations of one or more down laser beams 6 such that the recording lines are always optimally distributed onto the respectively remaining, largest remainder group of laser beams 6. A complex control can likewise be required for further sub-units of the exposure unit 4 in order to convert the exposure system to fewer laser beams. For example, the generation of the high-frequency modulation frequencies for the drive of one or more acousto-optical modulators is such a sub-unit.

In the simplest case, whether or not a fault of this type is present and which laser beams have failed is identified with a test exposure that is subsequently analyzed, for example, with a microscope. Solutions are also conceivable wherein the failure of the laser beams is identified by detectors in the optics head 5 and is reported to the control software of the exposer.

With the inventive multi-beam exposure method, the problem of the down laser beams 6 is solved without having to reconfigure the demultiplexer 12, i.e. without the involved control of the distributor 10 required therefor. According to the inventive method, the buffer memories 13 that belong to the laser beams 6 that are no longer participating in the recording are filled with "empty" recording lines (empty lines), i.e. with data values that modulate the corresponding laser beams 6 such that these laser beams 6 remain dark. For this purpose, the computer 7 inserts the empty lines at the required locations in the sequence of transmitted recording lines when sending the recording lines via the data line 9. The resolution of the empty lines is adapted to the resolution of the printing form data, i.e. the number of picture elements in the empty lines and in the lines of the printing form data is the same.

Figure 4:
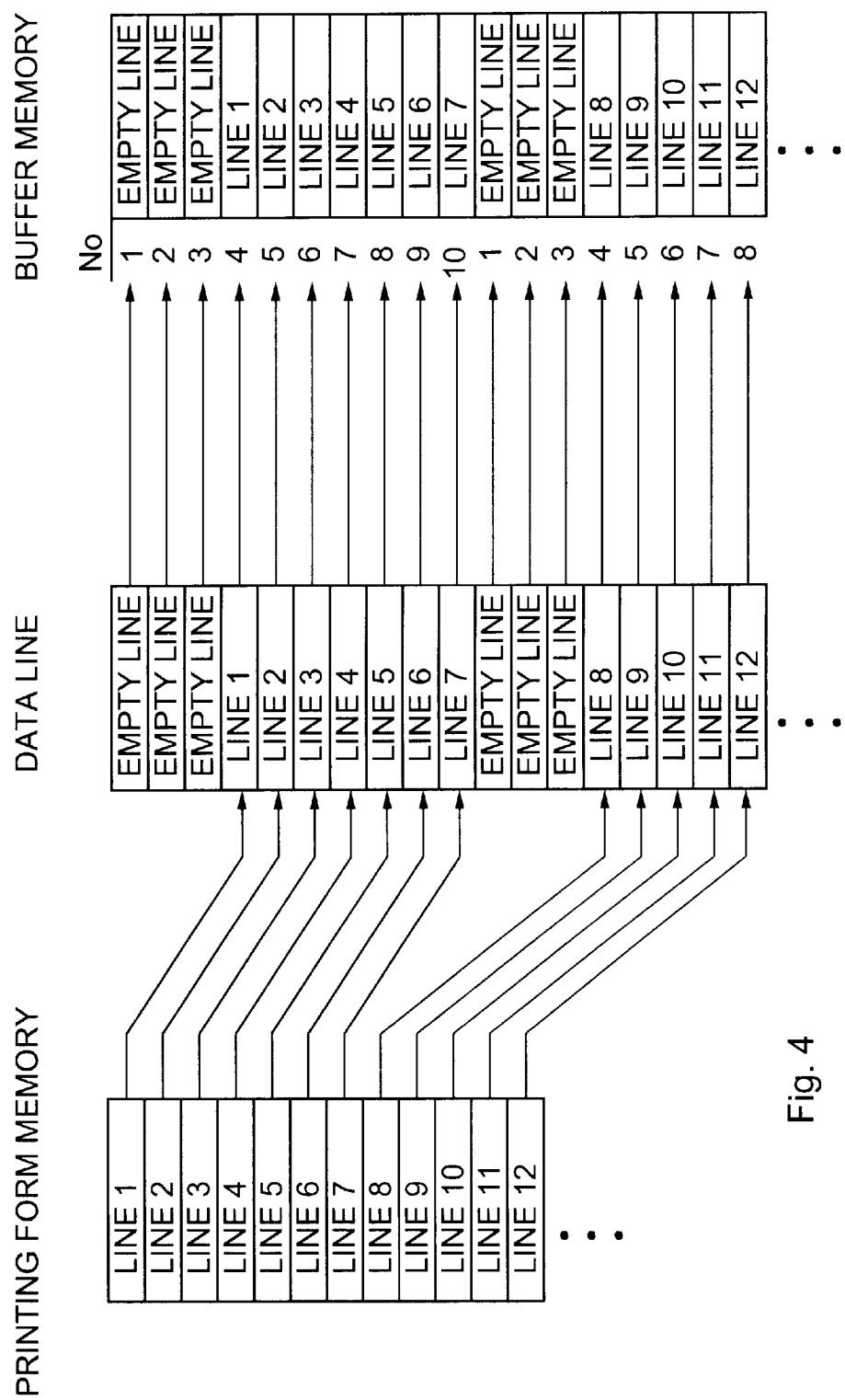
FIG. 4 illustrates the sequence of the recording lines of the invention in the printing form memory, on the data line and in the buffer memory.

FIG. 4 illustrates the method for the previously explained example wherein laser beam No. 3 has failed and the exposure system continues to work only with the sub-group of laser beams No. 4 through No. 10. The computer 7 initially sends three successive empty lines on the data line 9, then the lines 1 through 7 read from the printing form memory 8, then another three empty lines, then the lines 8 through 14 read from the printing form memory 8, etc. In its normal operating mode, the demultiplexer 12 cyclically distributes the lines sent on the data line 9 onto the buffer memories No. 1 through No. 10. The inserted empty lines are thereby always written into the buffer memories No. 1 through No. 3, and the lines 1 through 7, 8 through 14, etc., read from the printing form memory 8 are always written into the buffer memories No. 4 through No. 10. Additionally, the feed rate is set such that, following a revolution of the recording drum 1, the exposure unit 4 has only moved forward by the overall width of the remaining seven laser tracks that record the lines 1 through 7, 8 through 14, etc., from the printing form memory 8.

In an alternative embodiment of the inventive method, the computer 7 already enters the empty lines into the printing form memory 8 at the required locations during the editing of the printing form data. In this case, the lines are sent via the data line 9 to the exposure unit 4 in the same sequence during the recording as they are encountered in the printing form memory 8. In another alternative embodiment, the laser beams 6 that should not be active are shut off in the optics head 5. The empty lines then need not contain any data values with which the non-active laser beams 6 are driven dark, but can contain arbitrary printing form data.

The inventive multi-beam exposure method is suitable for all applications of printing form recording, i.e. for all types of printing forms and recording materials, as well as for all mechanical and optical variations of multi-beam exposure arrangements, particularly for drum exposers, inside drum exposers and flatbed exposers.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim as our invention:

1. A method for multi-beam exposure of a printing form with laser beams, comprising the steps of:
   subdividing the laser beams into active and inactive laser beams;
   transmitting with a computer printing form data to a distributor via a data line as a sequence of recording lines wherein recording lines of the printing form are transmitted via the data line for the active laser beams and empty lines are inserted into the transmitted sequence of the recording lines for the inactive laser beams, the empty lines containing arbitrary data values and the inactive laser beams are shut off; and
   cyclically distributing with the distributor the recording lines onto the input stages of an optics head wherein N parallel laser beams are generated and modulated with the printing form data of the recording lines.

2. The method according to claim 1 wherein the empty lines contain data values with which the inactive laser beams are driven dark.

3. The method according to claim 1 wherein the active laser beams form an interconnected sub-group of the laser beams.

4. A method for multi-beam exposure of a printing form with laser beams, comprising the steps of:
   subdividing the laser beams into active and inactive laser beams;
   transmitting with a computer printing form data to a distributor via a data line as a sequence of recording lines wherein recording lines of the printing form are transmitted via the data line for the active laser beams and empty lines are inserted into the transmitted sequence of the recording lines for the inactive laser beams, the empty lines containing arbitrary data values and the inactive laser beams are shut off; and
   cyclically distributing with the distributor the lines onto the input stages of an optics head wherein parallel laser beams are generated and modulated with the printing form data of the lines, the empty lines containing data values so that the inactive laser beams do not record.

* * * * *